(No Model.)
O. B. RUPPE.
MACHINE FOR SOWING SEED.
No. 508,986. Patented Nov. 21, 1893.
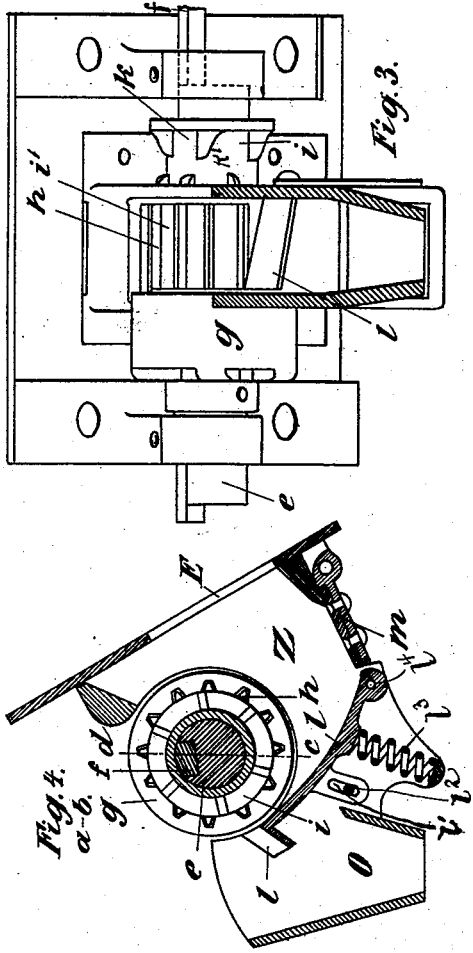
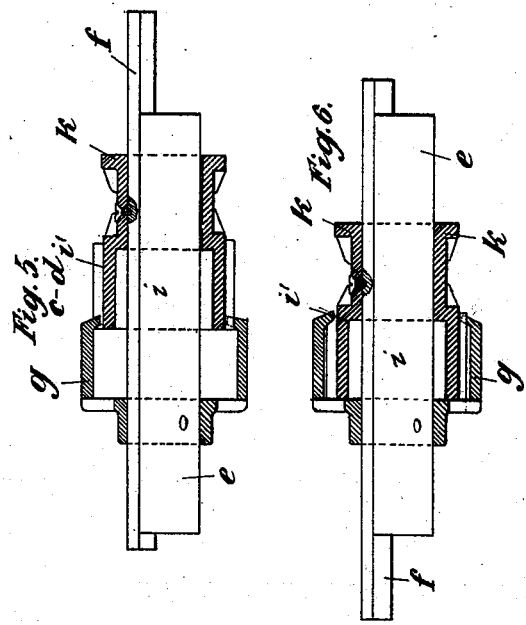
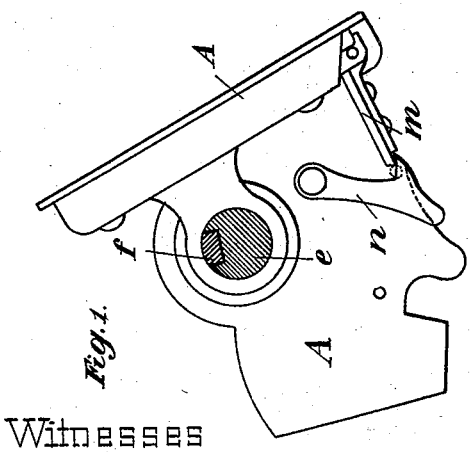
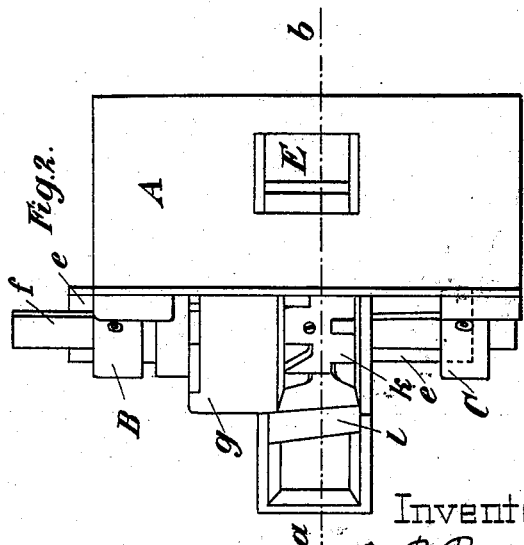
Witnesses
John C. Wilson
Brey C. Bowen
Inventor
O. B. Ruppe,
by Whitman & Wilkinson,
Attorneys.

UNITED STATES PATENT OFFICE.

OSKAR BERTHOLD RUPPE, OF APOLDA, GERMANY.

MACHINE FOR SOWING SEED.

SPECIFICATION forming part of Letters Patent No. 508,986, dated November 21, 1893.

Application filed May 16, 1893. Serial No. 474,472. (No model.)

*To all whom it may concern:*

Be it known that I, OSKAR BERTHOLD RUPPE, of 15 Mühlenstrasse, Apolda, Saxe-Weimar, German Empire, have invented a new and useful Improvement in Machines for Sowing Seed, of which the following is a specification, reference being had to the accompanying drawings.

This invention relates to seed-sowing machines or drill plows and consists of what may be termed a universal seed conveying or feeding device which simply by shifting a shaft or a spring or both may be so adjusted as to suit seeds of every description and variety capable of being sown in drills from the largest grades of pulse (such as beans, peas) down to cereals (such as wheat, rye) and even the smallest grain (such as poppy-seed) without in any way lessening the advantages resulting from sowing in drills or rows one of which is that the seed is prevented from accumulating at one point to the detriment of the resulting crop.

The invention will be best understood by reference to the accompanying drawings, in which—

Figures 1 to 6 illustrate the construction of the sowing machine, 1 being a side view; Fig. 2 a plan, and Fig. 3 a front view of the adjustable device. Fig. 4 is a section on line $a$—$b$ Fig. 2. Fig. 5 is a section on line $c$—$d$ Fig. 4, showing the grooved or fluted feeding wheels out of gear, and Fig. 6 is the same sectional view as Fig. 5 only with the feeding wheels thrown into gear.

A greater or less number of sowing troughs or cups A according to the length of the hopper are arranged on or in the frame of the machine. To these cups A sleeves B and C are screwed serving at the same time as bearings for the shaft $e$ and as stops for limiting the extent of displacement of the said shaft. The shaft $e$ is provided with a longitudinal groove in which is adjustably embedded a longitudinally extending slide bar or key $f$. On to the said shaft $e$ are also keyed rings $g$ the inner circumferences of which are provided with notches corresponding to the ribs $h$ of the grooved feeding wheels $i$. The feeding wheels $i$ and $k$ are preferably made in one and are rigidly connected with the bar $f$, and the said wheels $i$ are adapted to move within (*i.e.* slide in and out of) the rings $g$. The wheel $i$ is provided with teeth $i'$ running from end to end of the wheel and the wheel $k$ is provided with a set of short inclined teeth $k'$ around each end thereof.

The wall of the frame carries a spring controlled and yielding plate $l$ pivoted at $l^4$, provided with a slotted lug $l'$, engaging the stud $l^2$ and pressed forward by the spring $l^3$ for the purpose of equalizing the discharge of the seed and of affording a yielding passage for pieces of stone or other foreign bodies or impurities which may accidentally have been mixed with the seed so as to protect the feeding wheels from damage. The movement of the said plate is limited by a slotted lug $l'$ secured to the under side thereof, and a stud $l^2$ projecting from the wall of the hopper into the slot.

The door $m$ which while the machine is in operation is kept closed by the bolt or catch $n$, may be opened when the machine is at rest and when it is desired to remove from the sowing cup any seed, &c., still remaining therein.

The sowing shaft $e$ and slide $f$ are each fitted with a separate adjusting device so that both parts may be adjusted either separately or simultaneously.

The operation is as follows: The seed to be sown is placed in the cup Z through the inlet E. The grooved conveyer wheels $k$ or $i$ as they rotate carry it to the outlet O through which it drops on the soil. When it is desired to sow such large-sized produce as beans peas, &c., the shaft $e$ together with the rings $g$ wedged thereon is brought into the position shown in Fig. 2 and by the corresponding adjustment of the slide $f$ the wheel $k$ is moved up to inlet orifice E. Small grain such as corn and the like is provided for by so adjusting the slide as to bring the wheel $i$ in front of the inlet (Fig. 3). By suitably adjusting the rings $g$ upon the ribbed wheels $i$ the machine may be set for sowing the smaller grades of seed for which purpose the said wheels $i$ and rings $g$ need only be rotated. In the case of very small seed the shaft $e$ is so shifted as to bring the ring $g$ in front of the inlet orifice when by rotating the said shaft the ribs of the feeding wheels convey the seed to the outlet.

Figs. 5 and 6 illustrate the arrangement of the rings $g$ in combination with the ribbed wheels $i$ and $k$.

What I claim, and desire to secure by Letters Patent of the United States, is—

In a machine for sowing seed, the combination with an axially grooved shaft and a slide bar moving longitudinally in the groove of said shaft, of a conveying drum or wheel $k$ for larger grades of seeds, of a second drum or wheel $i$ for smaller grades of seed, the said drums being preferably made integral with each other, and being rigidly attached to said sliding bar; the hollow cylindrical adjusting drum $g$; the pivoted plate $l$, and the spring $l^3$ normally pressing said plate toward the feeding wheel, substantially as and for the purposes described.

In witness whereof I have hereunto set my hand in the presence of two witnesses.

OSKAR BERTHOLD RUPPE.

Witnesses:
PAUL FISCHER,
JOHN LALOWSKY.